(12) United States Patent
Nakagata et al.

(10) Patent No.: US 9,141,861 B2
(45) Date of Patent: Sep. 22, 2015

(54) VIDEO IMAGE FEATURE GENERATION SYSTEM AND VIDEO IMAGE FEATURE GENERATION METHOD

(71) Applicant: FUJITSU LIMITED, Kawasaki-shi, Kanagawa (JP)

(72) Inventors: Shohei Nakagata, Kawasaki (JP); Taizo Anan, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 32 days.

(21) Appl. No.: 14/075,268

(22) Filed: Nov. 8, 2013

(65) Prior Publication Data

US 2014/0270531 A1    Sep. 18, 2014

(30) Foreign Application Priority Data

Mar. 18, 2013 (JP) ................ 2013-054894

(51) Int. Cl.
*G06K 9/46* (2006.01)
*G06K 9/00* (2006.01)
*G06F 17/30* (2006.01)

(52) U.S. Cl.
CPC ...... *G06K 9/00758* (2013.01); *G06F 17/30784* (2013.01); *G06K 9/00744* (2013.01)

(58) Field of Classification Search
CPC .......... G06K 9/00758; G06K 9/00744; G06K 9/00201; G06K 9/46; G06T 7/0079; G06F 17/30784
See application file for complete search history.

(56) References Cited

U.S. PATENT DOCUMENTS

| 8,224,064 B1* | 7/2012 | Hassebrook et al. ......... 382/154 |
| 2011/0129155 A1 | 6/2011 | Oami et al. |
| 2013/0170695 A1* | 7/2013 | Anan et al. .................... 382/100 |

FOREIGN PATENT DOCUMENTS

| JP | 2001-109494 | 4/2001 |
| JP | 2009-3889 | 1/2009 |
| JP | 2011-118498 | 6/2011 |

* cited by examiner

*Primary Examiner* — Brian Le
(74) *Attorney, Agent, or Firm* — Staas & Halsey LLP (57) ABSTRACT

A video image feature generation system includes a processor; and a memory which stores a plurality of instructions, which when executed by the processor, cause the processor to execute, extracting a frame feature value featuring a frame, which is a unit of an input video image, based on a pixel value of the frame; and generating a phase of each frequency as a video image feature based on at least two frequencies, the frame feature value obtained in the extracting, and generation information for generating phases of the frequencies according to the frequencies and the frame feature value.

16 Claims, 10 Drawing Sheets

FRAME FEATURE VALUE $F[x_0][y_0]$ AT LOCATION $(x_0, y_0)$

FRAME FEATURE VALUE $F[x_{W-1}][y_{H-1}]$ AT LOCATION $(x_{W-1}, y_{H-1})$

FIG. 8B

ORIGIN

FREQUENCY IN HORIZONTAL DIRECTION

FREQUENCY $(a_m, b_m)$ AT LOCATION $(x_3, y_3)$

FREQUENCY $(a_{m+1}, b_{m+1})$ AT LOCATION $(x_4, y_4)$

FREQUENCY IN VERTICAL DIRECTION

FIG. 8C

PHASE $\theta_1$ OF FREQUENCY $(a_1, b_1)$ $\theta_1$ $\theta_2$ $\theta_3$ $\theta_4$ $\theta_5$ $\theta_6$
$(a_1,b_1)$ $(a_2,b_2)$ $(a_3,b_3)$ $(a_4,b_4)$ $(a_5,b_5)$ $(a_6,b_6)$

VIDEO IMAGE FEATURE

VIDEO IMAGE FEATURE OF MODIFIED VIDEO IMAGE

COMPARE BASED ON CORRELATION VALUE

VIDEO IMAGE FEATURE OF ORIGINAL VIDEO IMAGE

VIDEO IMAGE FEATURE GENERATION SYSTEM AND VIDEO IMAGE FEATURE GENERATION METHOD

CROSS-REFERENCE TO RELATED APPLICATION

This application is based upon and claims the benefit of priority from the prior Japanese Patent Application No. 2013-054894 filed on Mar. 18, 2013, the entire contents of which are incorporated herein by reference.

FIELD

The embodiments discussed herein are related to a video image feature generation system, a video image feature generation method, a video image feature generation program, a video image comparison system, a video image comparison method, and a video image comparison program.

BACKGROUND

There is a posting site that allows anybody to view a posted video image at any time. There is a possibility that a video image is illegally posted. For example, posting of a copy of a TV program, a movie, or the like infringes a copyright. In recent years, a huge number of video images have been posted on sites. In such a situation, it is very difficult to determine whether posted video images are legal or illegal by visually checking the video images or performing a search using keywords. Thus, there is a desire for a technique that allows it to efficiently evaluate identity of video images or similarity between video images.

A technique to determine whether video images are identical is disclosed, for example, in Japanese Laid-open Patent Publication No. 2011-118498. In this technique, relative luminance is calculated for various sub-areas of a video image, and a result is represented by one of three values, −1, 0, and 1 as a feature value for each video image. The calculated feature values are compared between video images to determine whether the video images are identical. More specifically, when the comparison indicates similarity higher than a threshold value, the video images are determined to be identical. In a technique disclosed, for example, in Japanese Laid-open Patent Publication No. 2009-3889 or Japanese Laid-open Patent Publication No. 2001-109494, the comparison is performed using a phase of a frequency.

SUMMARY

In accordance with an aspect of the embodiments, a video image feature generation system includes a processor; and a memory which stores a plurality of instructions, which when executed by the processor, cause the processor to execute, extracting a frame feature value featuring a frame, which is a unit of an input video image, based on a pixel value of the frame; and generating a phase of each frequency as a video image feature based on at least two frequencies, the frame feature value obtained in the extracting, and generation information for generating phases of the frequencies according to the frequencies and the frame feature value.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which.

DESCRIPTION OF EMBODIMENTS

Embodiments are described below with reference to drawings.

First Embodiment

Figure 1A:
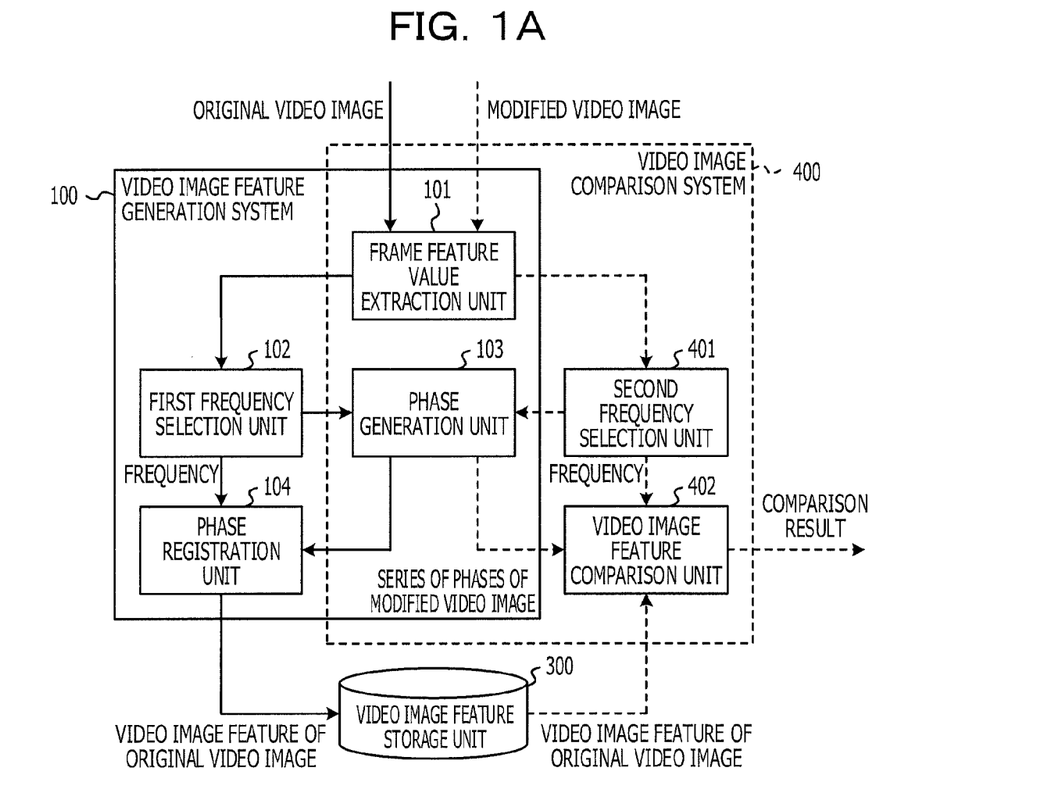
FIG. 1A is a block diagram illustrating an example of a video image feature generation system and an example of a video image comparison system.
Figure 1B:
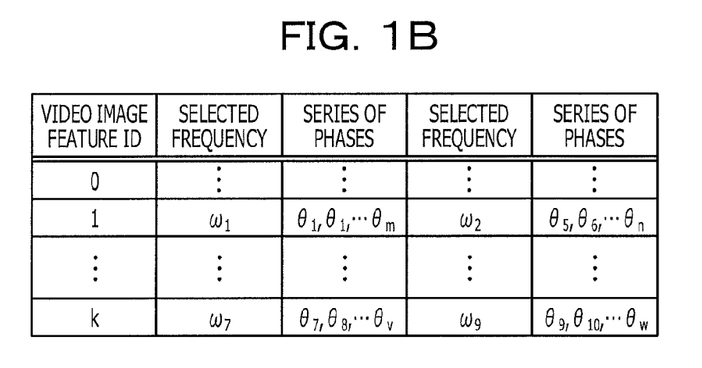
FIG. 1B is a diagram illustrating an example of a video image feature table.

FIG. 1A is a block diagram illustrating an example of a video image feature generation system 100 and an example of a video image comparison system 400. FIG. 1B illustrates an example of a video image feature table. The video image feature generation system 100 includes, as illustrated in FIG. 1A, a frame feature value extraction unit 101, a first frequency selection unit 102, a phase generation unit 103, and a phase registration unit 104. The video image comparison system 400 includes, as illustrated in FIG. 1A, the frame feature value extraction unit 101, the phase generation unit 103, a second frequency selection unit 401, and a video image feature comparison unit 402.

As described above, the frame feature value extraction unit 101 and the phase generation unit 103 are used by both the video image feature generation system 100 and the video image comparison system 400. Note that the video image feature generation system 100 and the video image comparison system 400 may be integrated into a single system, which may function as a video image checking apparatus, a video image checking system, or the like. Although in the example illustrated in FIG. 1A, the video image feature storage unit 300 is disposed outside the video image feature generation system 100 and the video image comparison system 400, the video image feature storage unit 300 may be disposed at least in one of the video image feature generation system 100 and the video image comparison system 400.

First, the video image feature generation system 100 is described below.

The frame feature value extraction unit 101 extracts a frame feature value featuring a frame, which is a unit of an input video image, based on a pixel value of the frame. More specifically, the frame feature value extraction unit 101 extracts a time series of frame feature values based on pixel values of frames included in the video image. Examples of input video images are an original video image without being modified, a modified video image generated from the original video image, or the like. Modifications may include editing, tampering, changing, transforming, converting, expanding/contracting, parallel displacing, and the like. The modified video image is an image subjected to a comparison with respect to the original video image. The video image is also called a motion image. The video image includes a series of consecutive still images which are units of the video image. Each still image is referred to as a frame or a frame image. The frame feature value extraction unit 101 extracts a frame feature value based on all pixel values included in each frame. As a result, for example, a mean pixel value, a variance, or the like is extracted as the frame feature value. Pixel values at respective locations on at least one frame included in the video image may be extracted as frame feature values.

The first frequency selection unit 102 selects at least two frequencies from a result of a Fourier transform performed on the frame feature values extracted by the frame feature value extraction unit 101. In a case where a time series of frame feature values is extracted by the frame feature value extraction unit 101, at least two frequencies are selected from a frequency spectrum based on the time series of frame feature values. In a case where pixel values at respective locations on at least one frame included in the video image are extracted as frame feature values, at least two frequencies including a horizontal component and a vertical component are extracted from a frequency domain based on the extracted frame feature values. For example, frequencies may be arranged in order of strength from the highest to the lowest and two frequencies with highest strength may be selected. Alternatively, at least two frequencies may be determined in advance in initial setting or by default. Alternatively, at least three frequencies may be determined in advance in initial setting or by default, and at least two frequencies may be selected from the at least three predetermined frequencies.

The phase generation unit 103 generates a phase for each frequency as a video image feature based on the at least two frequencies, the frame feature values extracted by the frame feature value extraction unit 101, and generation information for generating the phase of the frequency depending on the frequency and the frame feature values. The video image is featured by a video image feature. For example, a time series of phases is generated for each frequency as a video image feature based on the at least two frequencies selected by the first frequency selection unit 102 and the time series of frame feature values extracted by the frame feature value extraction unit 101. In a case where pixel values at respective locations on at least one frame included in the video image are extracted as frame feature values, a phase of each frequency is generated as a video image feature based on the at least two frequencies selected by the first frequency selection unit 102 and the frame feature values extracted by the frame feature value extraction unit 101.

The phase registration unit 104 registers, in the video image feature storage unit 300, the video image feature including the at least two frequencies selected by the first frequency selection unit 102 and the phases generated by the phase generation unit 103. More specifically, the phase registration unit 104 registers, in the video image feature storage unit 300, the phases, the frequencies used in generating the phase, and video image feature ID assigned thereto in a manner in which these are related to each other. The video image feature ID is identification information identifying the video image feature.

The video image feature storage unit 300 includes, for example, a hard disk drive. The video image feature storage unit 300 stores a video image feature table. The video image feature table includes, as illustrated in FIG. 1B, a video image feature ID, selected frequencies, and a series of phases, for each video image feature ID. Each video image feature ID is related to at least two frequencies and a series of phases of each frequency. For example, a video image feature ID "1" is related to the following: a selected frequency "$\omega_1$" as a video image feature; a corresponding series of phases "$\theta_1, \theta_2, \ldots, \theta_m$", a selected frequency "$\omega_2$"; and a corresponding series of phases "$\theta_5, \theta_6, \ldots, \theta_n$". The video image feature ID is represented, for example, by an integer greater than or equal to 0. The at least two frequencies are frequencies selected by the first frequency selection unit 102. The at least two frequencies may be determined in advance in the initial setting or by default. For example, in a case where six frequencies are selected as in a second embodiment described later, the video image feature table includes six selected frequencies and phases of the respective selected frequencies. In a case where the phase registration unit 104 registers a new video image feature in a state in which video image features with video image feature IDs up to "k" have already been registered as illustrated in FIG. 1B, a video image feature ID "k+1" is assigned to the new video image feature in the registration. In the video image feature storage unit 300, as described above, video image features of original video images are sequentially registered. That is, a database of video image features featuring the original video images are formed.

Next, the video image comparison system 400 is described. Note that the frame feature value extraction unit 101 and the phase generation unit 103 have already been described, and thus a further description thereof is omitted.

The second frequency selection unit 401 selects at least two frequencies from a result of a Fourier transform performed on the frame feature values extracted by the frame feature value extraction unit 101. In a case where a time series of frame feature values is extracted by the frame feature value extraction unit 101, at least two frequencies are selected from a frequency spectrum based on the time series of frame feature values. In a case where pixel values at respective locations on at least one frame included in the video image are extracted as frame feature values, at least two frequencies including a horizontal component and a vertical component are selected from a frequency domain based on the extracted frame feature value. Alternatively, at least two frequencies may be determined in advance in the initial setting or by default. Alternatively, at least three frequencies may be determined in advance in the initial setting or by default, and at least two frequencies may be selected from the at least three predetermined frequencies. In a case where frequencies are arranged in order of strength from the highest to the lowest and two frequencies with highest strength are selected by the first frequency selection unit 102, the second frequency selection unit 401 selects all allowable frequencies from a frequency spectrum or a frequency domain.

The video image feature comparison unit 402 compares the video image features generated by the phase generation unit 103 between the modified video image and the original video image. More specifically, first the video image feature comparison unit 402 generates a video image feature of the modified video image based on the frequencies selected by the second frequency selection unit 401 and the phases of the modified video image generated by the phase generation unit 103. Next, the video image feature comparison unit 402 acquires the video image feature of the original video image registered in the video image feature storage unit 300. Finally, the video image feature comparison unit 402 compares the video image feature of the modified video image with a video image feature of an original video image. In a case where a result of the comparison indicates that there is an original video image with a video image feature equal or similar to the video image feature of the modified video image, the original video image corresponding to the video image feature or information associated with the original video image is output as a comparison result. On the other hand, in a case where there is no original video image with a video image feature similar to the video image feature of the modified video image, a comparison failure message is output as a comparison result. Note that the video image feature comparison unit 402 may acquire the video image feature of the original video image directly from the phase registration unit 104.

Next, with reference to FIG. 2, a hardware configuration of the video image feature generation system 100 is described below.

Figure 2:
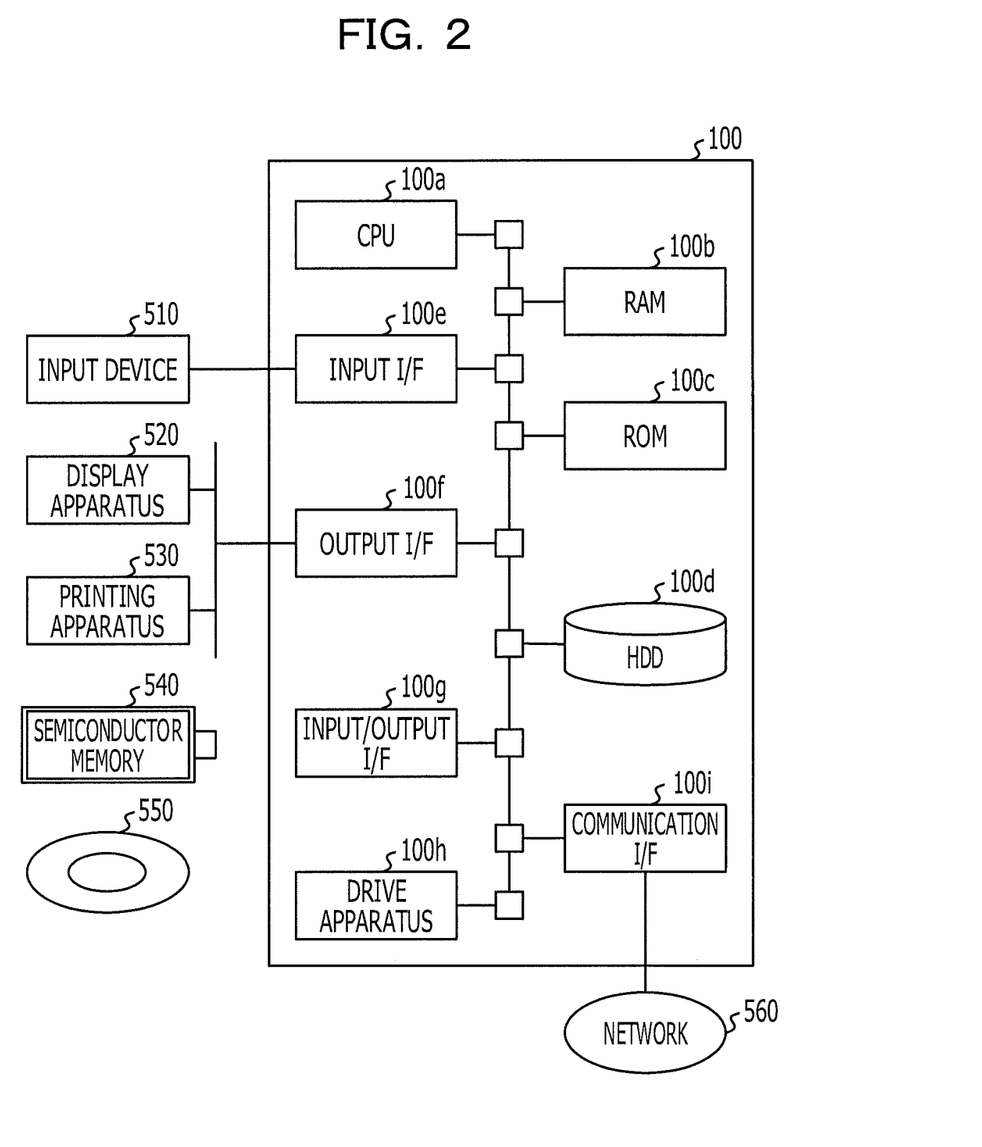
FIG. 2 is a diagram illustrating an example of a hardware configuration of a video image feature generation system.

FIG. 2 illustrates an example of a hardware configuration of the video image feature generation system 100. The video image feature generation system 100 includes a central processing unit (CPU) 100a, a random access memory (RAM) 100b, a read only memory (ROM) 100c, and a hard disc drive (HDD) 100d. The video image feature generation system 100 also includes an input interface (I/F) 100e, an output I/F 100f, and an input/output I/F 100g. The video image feature generation system 100 also includes a drive apparatus 100h and a communication interface 100i. These units 100a to 100i are connected to each other via a bus 100j. A computer is realized by a cooperation of, at least, the CPU 100a and the RAM 100b.

An input device 510 is connected to the input I/F 100e. Examples of input devices include a keyboard, a mouse, and the like. An output device is connected to the output I/F 100f. An examples of output devices include a display apparatus (such as a liquid crystal display) 520, a printing apparatus (such as a printer) 530, and the like. A semiconductor memory 540 is connected to the input/output I/F 100g. Examples of the semiconductor memory 540 include a universal serial bus (USB) memory, a flash memory, and the like. The input/output I/F 100g reads a program and data stored in the semiconductor memory 540. The input I/F 100e, the output I/F 100f, and the input/output I/F 100g each include, for example, an USB port.

A portable storage medium 550 is inserted into the drive apparatus 100h. An example of the portable storage medium 550 is a removal disk such as a compact disc (CD)-ROM, a digital versatile disc (DVD), or the like. The drive apparatus 100h reads a program and/or data stored in the portable storage medium 550. The communication I/F 100i includes a local area network (LAN) interface (such as a LAN card, a network adapter, or the like) and a modem. A network 560 is connected to the communication I/F 100i. Examples of the network 560 include a LAN, a public network, the Internet, and the like.

The RAM 100b reads a video image feature generation program stored in the ROM 100c, the HDD 100d, or the semiconductor memory 540. The RAM 100b also reads a video image feature generation program stored in the portable storage medium 550. The read video image feature generation program is executed by the CPU 100a thereby realizing functions 101, . . . , 104 of the video image feature generation system 100. Processing steps of the video image feature generation method are also executed by the video image feature generation system 100. The video image feature generation program may correspond to a flow chart described later. Note that a hardware configuration of the video image comparison system 400 may basically be similar to that of the video image feature generation system 100.

Next, referring to FIG. 3 and FIG. 4, a video image feature generation method executed by the video image feature generation system 100 is described below.

Figure 3:
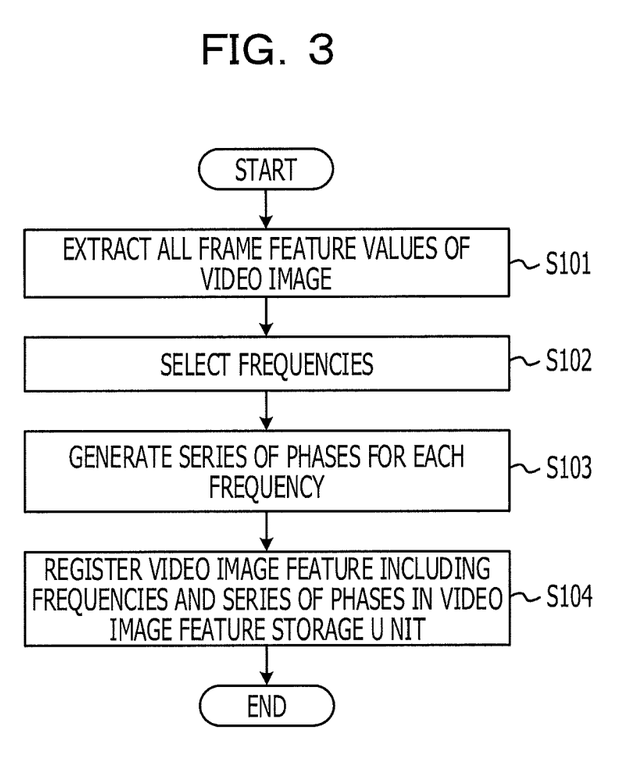
FIG. 3 is a flow chart illustrating an example of a sequence of processing steps performed by a video image feature generation system according to a first embodiment.
Figure 4A:
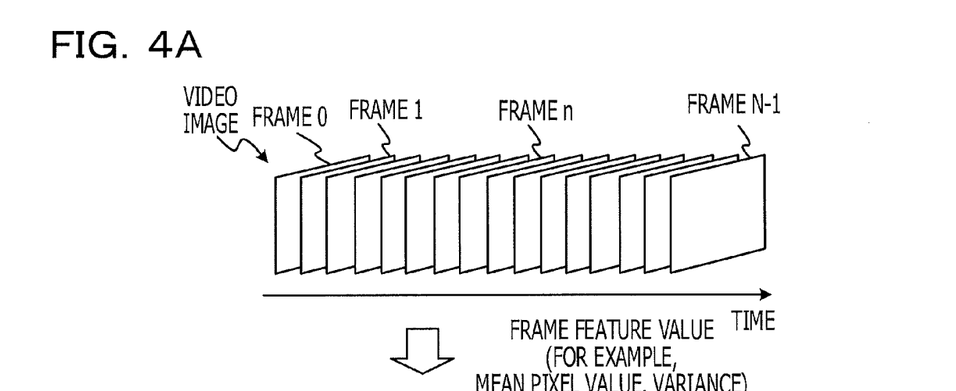
FIGS. 4A to 4C are diagrams illustrating a manner of generating a video image feature according to a first embodiment.
Figure 4B:
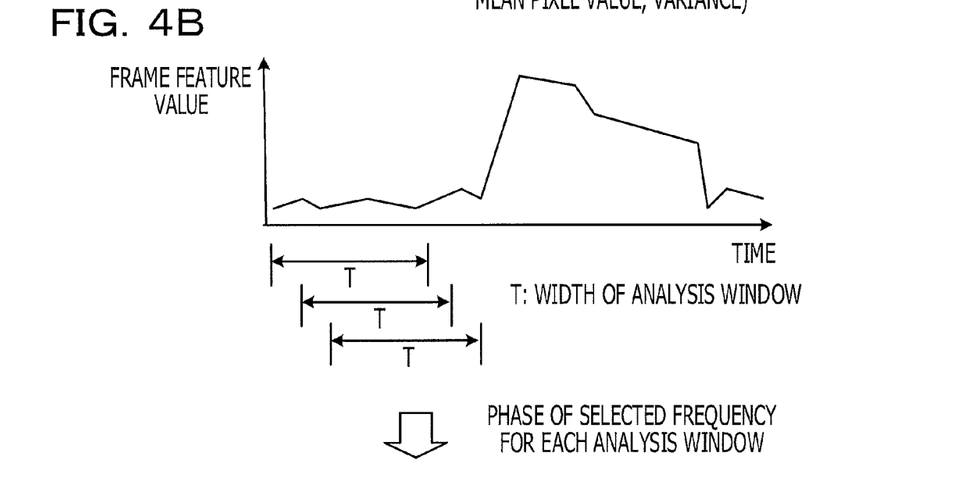
Figure 4C:
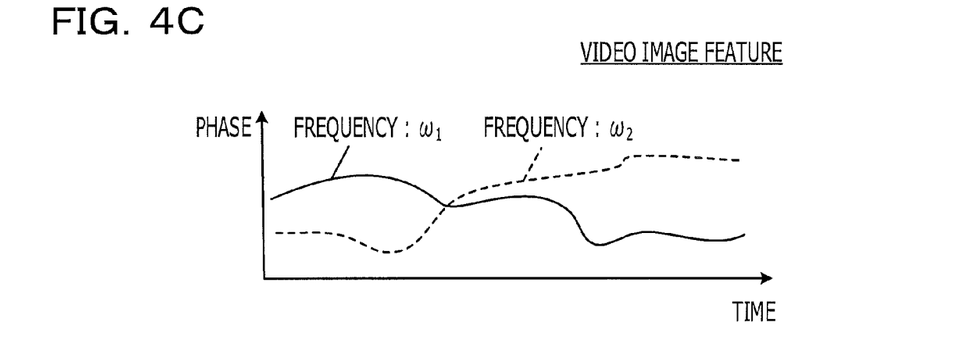

FIG. 3 is a flow chart illustrating an example of a sequence of processing steps performed by the video image feature generation system 100 according to the first embodiment. FIGS. 4A to 4C illustrate a manner of generating a video image feature according to the first embodiment. As illustrated in FIG. 3, when a video image is input to the frame feature value extraction unit 101, the frame feature value extraction unit 101 extracts all frame feature values of the input video image (step S101). The video image is an original video image or a modified video image. More specifically, referring to FIG. 4A, the video image includes a plurality of frames, and the frames are assigned serial frame numbers, such as frame 0, frame 1, . . . , frame n, . . . , frame N−1. That is, in this specific example, the video image includes N consecutive frames. The frames are arranged in order of time of occurrence. Hereinafter, such an arrangement will also be referred to simply as a time series. A time series of frame feature values are extracted based on the video image. As a result, the time series of frame feature values is obtained, for example, as illustrated in FIG. 4B.

The frame feature value may be, for example, a mean pixel value, a variance, or the like. In a case where the mean pixel value is used as the frame feature value, the frame feature value F[n] may be calculated according to Equation (1) described below.

$$F[n] = \frac{1}{WH}\sum_{y=0}^{H-1}\sum_{x=0}^{W-1} G(x, y, n) \quad (1)$$

In a case where the variance is employed as the frame feature value, the frame feature value F[n] may be calculated according to Equation (2) described below.

$$F[n] = \frac{1}{WH}\sum_{y=0}^{H-1}\sum_{x=0}^{W-1} (G(x, y, n) - \mu(n))^2 \quad (2)$$

In the above Equations (1) and (2), G(x, y, n) represents a pixel value at a location (x, y) on a frame with a frame number n. The pixel value may be, for example, a luminance value, a RGB value, a XYZ value (tristimulus value). W denotes the number of pixels in a horizontal direction in each frame. H denotes the number of pixels in a vertical direction in each frame. Thus, the frame has a size of W×H. Furthermore, μ(n) denotes a mean value of G(x, y, n) over all locations.

After the frame feature values F[0], . . . , F[N−1] are extracted by the frame feature value extraction unit 101, the first frequency selection unit 102 selects frequencies (step S102). In the selecting frequencies, at least two frequencies (for example, M frequencies) are selected. The frequencies are selected from a frequency spectrum. The frequency spectrum is obtained as a result of a one-dimensional Fourier transform performed on the frame feature values F[0], . . . , F[N−1]. Hereinafter, the selected frequencies are denoted as frequencies $\omega_0, \omega_1, \ldots, \omega_m, \ldots, \omega_{M-1}$.

After the frequencies $\omega_0, \omega_1, \ldots, \omega_m, \ldots, \omega_{M-1}$ are selected by the first frequency selection unit 102, the phase generation unit 103 generates a series of phases of each frequency (step S103). More specifically, as illustrated in FIG. 4B, analysis windows (analysis zones) each having a predetermined width T are set on the time series of frame feature values. The width T indicates the number of samples included in the analysis window of the time series of frame feature values. For example, when T=6, F[0], . . . , F[5] are sampled. As a result of the sampling, phases of the respective selected frequencies are generated. For example, in a case where frequencies $\omega_1$ and $\omega_2$ are selected, phases $\theta_1[0]$ and $\theta_2[0]$ are generated for the frame feature values F[0], . . . , F[5]. When one phase has been generated for each frequency, the analysis window is shifted by an amount corresponding to one frame, and a new phase is generated for each frequency. As a result, phases $\theta_1[1]$ and $\theta_2[1]$ are generated for the frame feature values F[1], . . . , F[6]. Subsequently, phases $\theta_1[N-T]$ and $\theta_2[N-T]$ are generated in a similar manner. Thus, N−T+1 phases $\theta_1[0], \theta_1[1], \ldots, \theta_1[N-T]$ are generated for the frequency $\omega_1$, and N−T+1 phases $\theta_2[0], \theta_2[1], \ldots, \theta_2[N-T]$ are generated for the frequency $\omega_2$. That is, a time series of phases is generated for each frequency.

The phase $\theta_m[n]$ for the frequency $\omega_m$ may be calculated in a manner described below according to Equations (3) and (4). First, a Fourier coefficient $C_m[n]$ for the frame feature value F[n] is calculated according to Equation (3) described below. Next, according to Equation (4) described below, a phase $\theta_m[n]$ of the Fourier coefficient $C_m[n]$ is calculated. Equations (3) and (4) form generation information.

$$C_m[n] = \sum_{t=n}^{n+T-1} F[t] \times \exp(-i\omega_m t) \quad (3)$$

$$\theta_m[n] = \arctan(\mathrm{Im}(C_m[n])/\mathrm{Re}(C_m[n])) \quad (4)$$

In Equation (4), $\mathrm{Re}(C_m[n])$ represents a real part of a complex number $C_m[n]$, and $\mathrm{Im}(C_m[n])$ represents an imaginary part of the complex number $C_m[n]$.

After the series of phases for each frequency is generated by the phase generation unit 103, the phase registration unit 104 registers the video image feature including the selected frequencies and the series of phases in the video image feature storage unit 300 (step S104). The video image feature includes, as illustrated in FIG. 4C, a time series of phases for each frequency.

Next, a video image comparison method executed by the video image comparison system 400 is described below with reference to FIG. 5 and FIG. 6.

Figure 5:
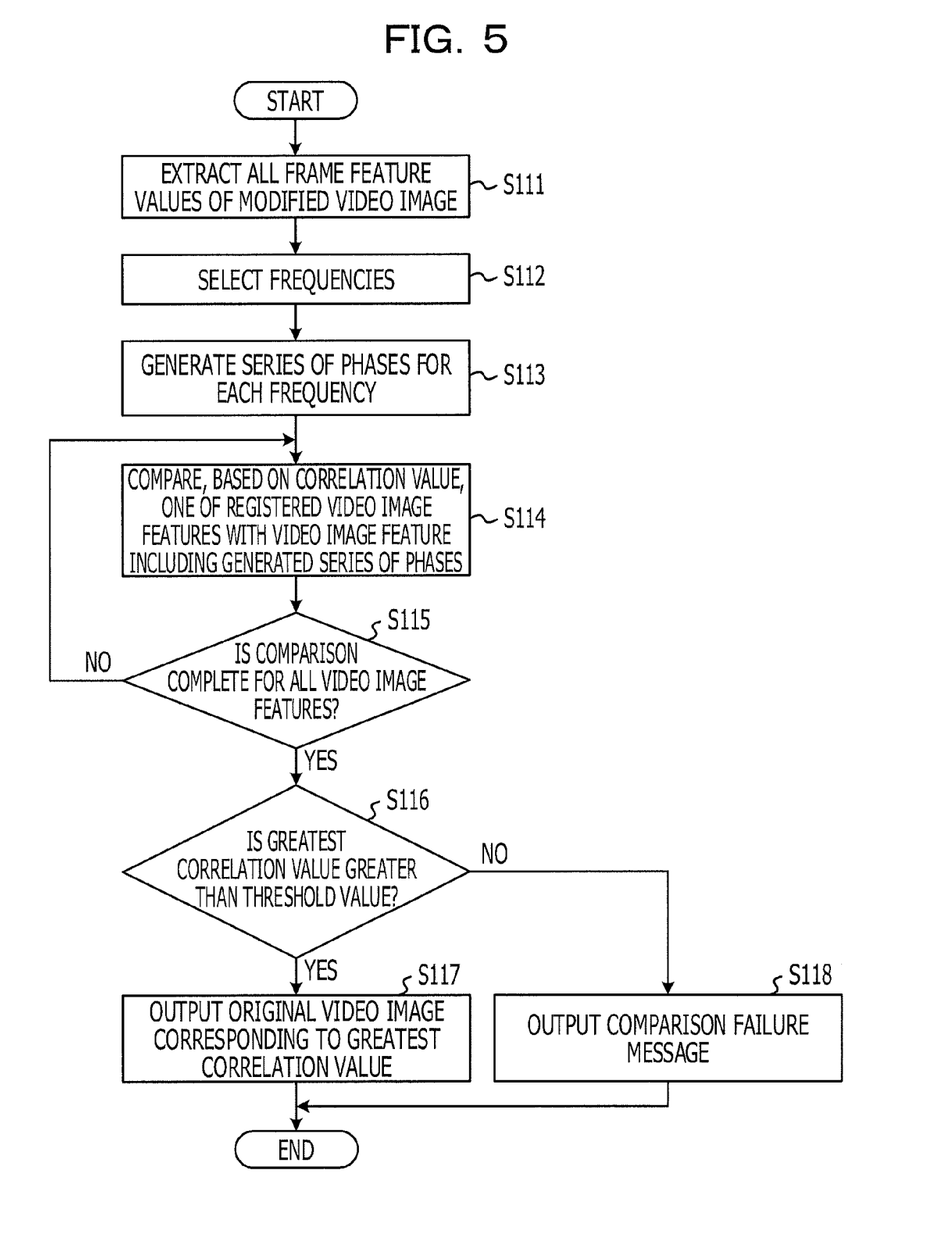
FIG. 5 is a flow chart illustrating an example of a sequence of processing steps performed by a video image comparison system according to a first embodiment.
Figure 6:
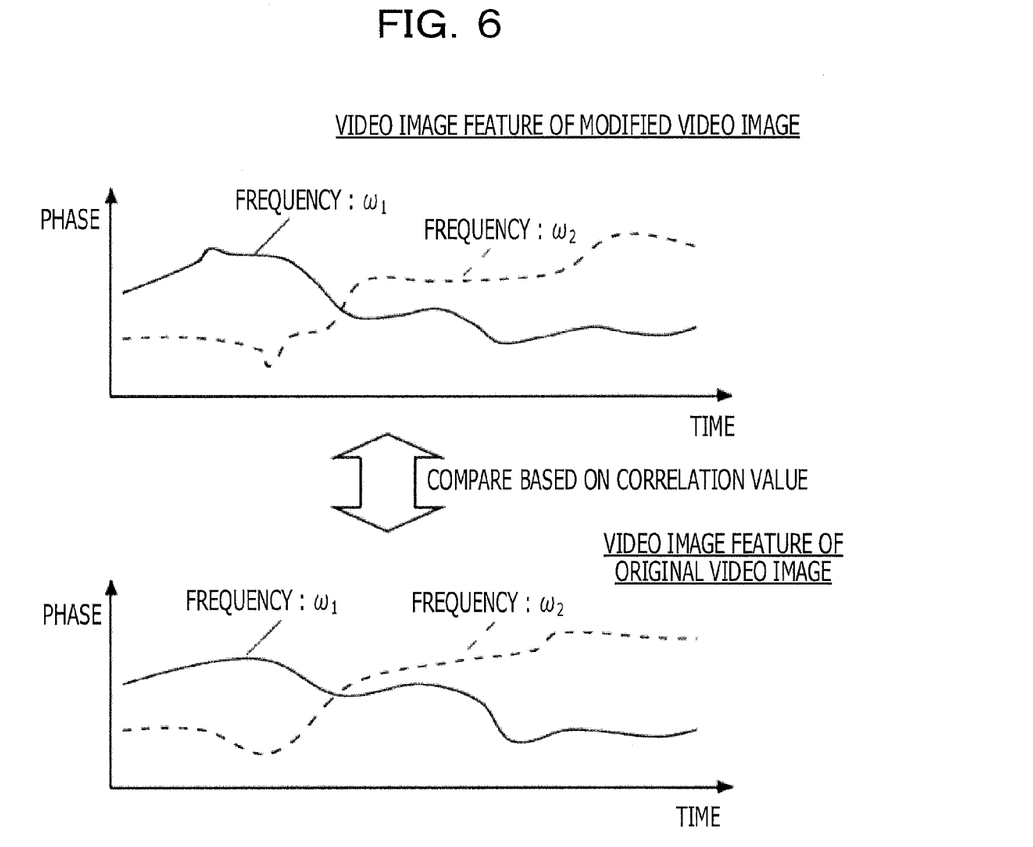
FIG. 6 is a diagram illustrating a manner in which video images are compared according to a first embodiment.

FIG. 5 is a flow chart illustrating an example of a sequence of processing steps performed by the video image comparison system 400 according to the first embodiment. FIG. 6 is a diagram illustrating a manner in which video images are compared according to the first embodiment. Note that steps S111 to S113 described below are basically similar to steps S101 to S103 described above.

When a modified video image is input to the frame feature value extraction unit 101, the frame feature value extraction unit 101 extracts all frame feature values of the modified video image as illustrated in FIG. 5 (step S111). After the frame feature values F[0], . . . , F[N−1] of the modified video image are extracted by the frame feature value extraction unit 101, the second frequency selection unit 401 selects frequencies (step S112). In the selecting frequencies, at least two frequencies (for example, L frequencies) are selected. Hereinafter, the selected frequencies are denoted as frequencies $\rho_0, \rho_1, \ldots, \rho_l, \ldots, \rho_{L-1}$. In a case where the second frequency selection unit 401 selects the same frequencies as those selected by the first frequency selection unit 102, the frequencies are given as follows: $\rho_0=\omega_0, \rho_1=\omega_1, \ldots, \rho_l=\omega_m, \ldots, \rho_{L-1}=\omega_{M-1}$. In a case where frequencies are arranged in order of strength from the highest to the lowest and two frequencies with highest strength are selected by the first frequency selection unit 102, the second frequency selection unit 401 selects all frequencies $\rho_0, \rho_1, \ldots, \rho_l, \ldots, \rho_{L-1}$.

After the frequencies (for example, frequencies $\rho_1 (=\omega_1)$ and $\rho_2 (=\omega_2)$) are selected by the second frequency selection unit 401, the phase generation unit 103 generates a series of phases of each frequency (step S113). As a result, N−T+1 phases $\phi_1[0], \phi_1[1], \ldots, \phi_1[N-T]$ are generated for the frequency $\rho_1$, and N−T+1 phases $\phi_2[0], \phi_2[1], \ldots, \phi_2[N-T]$ are generated for the frequency $\rho_2$. That is, a time series of phases of each frequency is generated for the modified video image. In a case where all frequencies are selected, a time series of phases is generated for each of all frequencies.

Subsequently, the video image feature comparison unit 402 compares, based on a correlation value, one of video image features registered in the video image feature storage unit 300 with the video image feature including the generated series of phases (step S114). More specifically, first, the video image feature comparison unit 402 generates the video image feature of the modified video image including the frequencies selected by the second frequency selection unit 401 and the series of phases of each frequency generated by the phase generation unit 103. Next, the video image feature comparison unit 402 extracts, from the video image feature storage unit 300, a video image feature having the same frequencies as those selected by the second frequency selection unit 401. For example, when frequencies $\rho_1$ and $\rho_2$ are selected, if a video image feature of frequencies $\omega_1$ and $\omega_2$ and a video image feature of frequencies $\omega_7$ and $\omega_9$ are found as video image features registered in the video image feature storage unit 300, then the video image feature with the same frequencies $\omega_1$ and $\omega_2$ as the frequencies $\rho_1$ and $\rho_2$ is extracted from the video image feature storage unit 300. In a case where there is a plurality of video image features having the same frequencies as those selected by the second frequency selection unit 401, all such video image features are extracted. Hereinafter, for convenience of illustration, frequencies $\rho_l$ (for example, $\rho_1, \rho_2$) equal to the frequencies $\omega_m$ (for example, $\omega_1, \omega_2$) are denoted as frequencies $\rho'_m$, and corresponding phases are denoted as $\phi'_m[n]$. Subsequently, the video image feature comparison unit 402 acquires one of the plurality of extracted video image features. Thereafter, as illustrated in FIG. 6, the video image feature comparison unit 402 calculates a correlation value R[k] between the acquired video image feature of the original video image and the video image feature of the modified video image thereby evaluates the similarly between them. The correlation value R[k] indicates the similarity between the two video image features. The higher the correlation value R[k], the higher the similarity. The correlation value R[k] is temporarily stored.

In the first embodiment, the correlation value R[k] may be calculated according to Equation (5) described below. As may be seen from Equation (5), when phases in time series are projected onto a circle with a radius of 1 in a complex plane (for example, a phase θ is projected to exp(iθ)), the correlation value R[k] is given by an inner product of these points. Note that exp(φ'$_m$[n]) with a bar put thereover denotes a complex conjugate number of exp(φ'$_m$[n]).

$$R[k] = \sum_{m=0}^{M-1} \left| \sum_{n=0}^{N-T+1} \exp(i\theta_m[n]) \times \overline{\exp(i\phi'_m[n])} \right| \quad (5)$$

The correlation value R[k] calculated according to Equation (5) described above is not influenced by a temporal shift of the modified video image. When a temporal shift occurs in the modified video image, the phases φ'$_m$[n] and φ'$_{m+i}$[n] of the respective frequencies ρ'$_m$ and ρ'$_{m+1}$ have the same shift. Here, let this shift be denoted by δ$_m$. When the correlation value obtained for the modified video image with the temporal shift δ$_m$ is R'[k], the right-hand side of correlation value R'[k] is rewritten as Equation (6) described below. Thus, the correlation value R'[k] is equal to the correlation value R[k]. That is, any temporal shift in the modified video image does not cause a change in correlation value R[k].

$$R'[k] = \sum_{m=0}^{M-1} \left| \sum_{n=0}^{N-T+1} \exp(i\theta_m[n]) \times \overline{\exp(i\phi'_m[n] + \delta_m)} \right| \quad (6)$$

$$= \sum_{m=0}^{M-1} \left| \exp(-\delta_m) \sum_{n=0}^{N-T+1} \exp(i\theta_m[n]) \times \overline{\exp(i\phi'_m[n])} \right|$$

$$= \sum_{m=0}^{M-1} \left| \sum_{n=0}^{N-T+1} \exp(i\theta_m[n]) \times \overline{\exp(i\phi'_m[n])} \right|$$

$$= R[k]$$

When the comparison process for particular video image features is complete, the video image feature comparison unit 402 then determines whether the comparison is complete for all extracted video image features (step S115). In a case where the determination by the video image feature comparison unit 402 is that the comparison is not complete for all extracted video image features (answer to step S115 is NO), the processing flow returns to step S114. In this case, a next video image feature is acquired from the extracted video image features, and the comparison is performed by calculating the correlation value R[k] with respect to the video image feature of the modified video image. When the calculated correlation value R[k] is greater than the temporarily stored immediately previous correlation value R[k], the immediately previous correlation value R[k] is replaced by the calculated new correlation value R[k]. Thus, the correlation value R[k] stored temporarily is highest in value.

In a case where the comparison is complete for all extracted video image feature (answer to step S115 is YES), the video image feature comparison unit 402 determines whether the greatest correlation value R[k] is greater than a threshold value (step S116). The threshold value is a predetermined value indicating high similarity. For example, the threshold value is predetermined in a range from 0.8 to 1.0. The lower limit of the threshold value may be 0.9, 0.95, or greater.

In a case where the greatest correlation value R[k] is greater than the threshold value (answer to step S116 is YES), the video image feature comparison unit 402 outputs an original video image corresponding to the greatest correlation value R[k] (step S117). Alternatively, instead of the original video image, information associated with the original video image may be output as a comparison result. On the other hand, in a case where the greatest correlation value R[k] is not greater than the threshold value (answer to step S116 is NO), the video image feature comparison unit 402 outputs a comparison failure message as a comparison result (step S118).

As described above, the frame feature values used in the first embodiment are extracted based on all pixel values included in each frame. Therefore, even if the aspect ratio of a video image is changed or cropping is performed on a video image, no reduction occurs in accuracy of evaluating the similarity of the video image. That is, the modification of a video image dos not have a significant influence on accuracy in comparing the modified video image with its original video image. For example, when an original video image of a TV program or a movie is captured using a video camera or the like, even if the captured video image has a tilt with respect to the original video image, the tilt does not result in a reduction in accuracy of evaluating the similarity of the video image.

Furthermore, a modification such as a change in contrast of an original video image or an expansion or contraction of a pixel value histogram or a parallel shifting thereof does not result in a reduction in accuracy of evaluating the similarity of the video image. Therefore, even when a video image captured using a video camera has a color tone different from that of the original video image, no reduction occurs in accuracy of evaluating the similarity of the video image.

Second Embodiment

A second embodiment is described below with reference to FIG. 7, FIGS. 8A to 8C, FIG. 9, and FIG. 10. The second embodiment is different from the first embodiment in the method of extracting frame feature values and the format of video image features. First, referring to FIG. 7 and FIGS. 8A to 8C, the method of generating video image features executed by the video image feature generation system 100 is described below.

Figure 7:
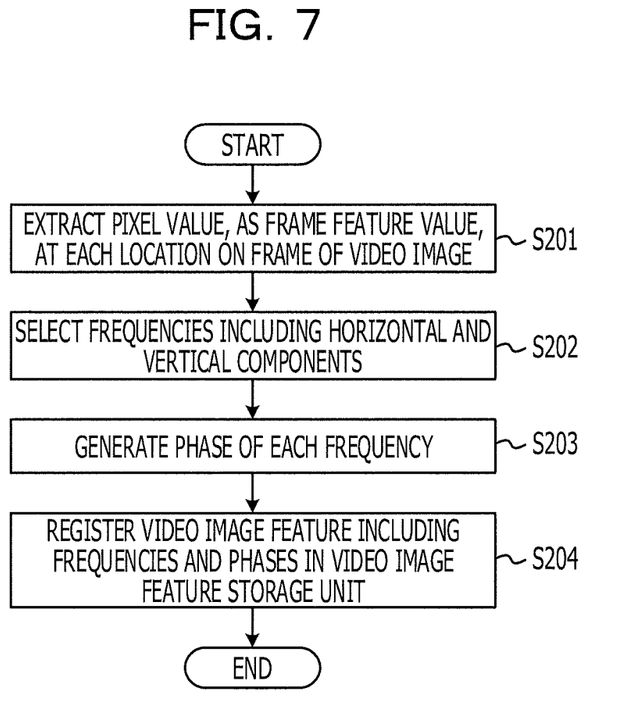
FIG. 7 is a flow chart illustrating an example of a sequence of processing steps performed by a video image feature generation system according to a second embodiment.
Figure 8A:
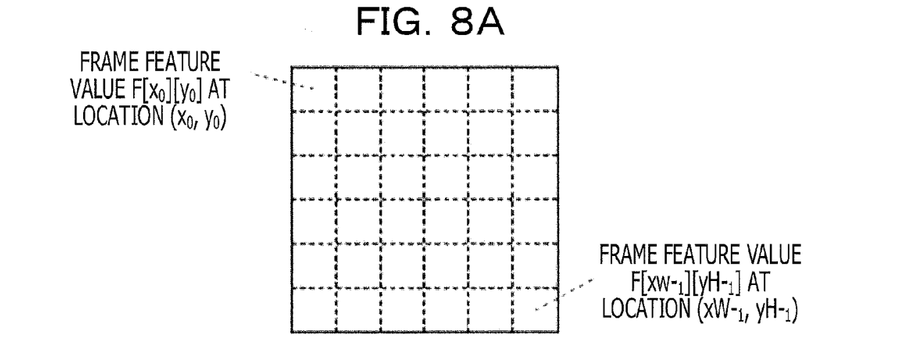
FIGS. 8A to 8C are diagrams illustrating a manner of generating a video image feature according to a second embodiment.
Figure 8B:
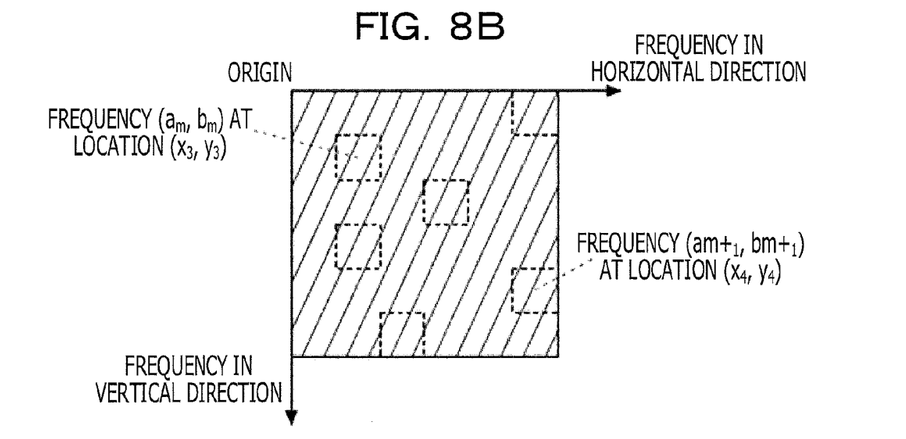
Figure 8C:
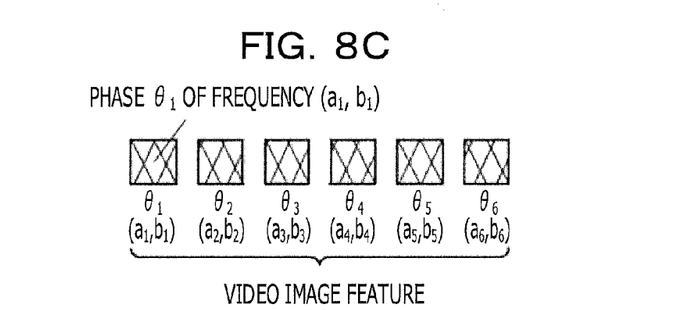

FIG. 7 is a flow chart illustrating an example of a sequence of processing steps performed by the video image feature generation system 100 according to the second embodiment. FIGS. 8A to 8C illustrate a manner of generating video image features according to the second embodiment. When a video image (for example, an original video image or a modified video image) is input to the frame feature value extraction unit 101, the frame feature value extraction unit 101 extracts a pixel value as a frame feature value at each location on the frame of the input video image as illustrated in FIG. 7 (step S201). More specifically, as illustrated in FIG. 8A, one frame is selected from a plurality of frames included in the input video image, and a pixel value at each location on the selected frame is extracted as the frame feature value. For example, a pixel value at a location (x$_0$, y$_0$) is extracted as a frame feature value F[x$_0$][y$_0$]. A pixel value at a location (x$_{W-1}$, y$_{H-1}$) is extracted as a frame feature value F[x$_{W-1}$][y$_{H-1}$]. The frame feature value F[x][y] is extracted for all pixels. Alternatively, at least two frames may be selected from a plurality of frames included in the input video image as described in detail later.

Thereafter, the first frequency selection unit 102 selects frequencies including a horizontal component and a vertical component (step S202). In the selecting frequencies, at least two frequencies (for example, M frequencies) are selected. As illustrated in FIG. 8B, the frequencies are selected from a frequency domain. Note that the frequency domain is obtained as a result of a two-dimensional Fourier transform performed on the frame feature values $F[x_0][y_0], \ldots, F[x_{W-1}][y_{H-1}]$. In the example illustrated in FIG. 8B, a total of six frequencies including a frequency $(a_m, b_m)$ at a location $(x_3, y_3)$, a frequency $(a_{m+1}, b_{m+1})$ at a location $(x_4, y_4)$, and so on are selected. Hereinafter, selected frequencies are denoted as frequencies $(a_0, b_0), (a_1, b_1), \ldots, (a_m, b_m), \ldots, (a_{M-1}, b_{M-1})$.

Subsequently, the phase generation unit 103 generates a phase of each frequency (step S203). The phase $\theta_m$ of the frequency $(a_m, b_m)$ may be calculated according to Equations (7) and (8) described below. First, a Fourier coefficient $C_m$ of the frame feature value $F[x][y]$ at the frequency $(a_m, b_m)$ is calculated according to Equation (7) described below. Subsequently, a phase $\theta_m$ at the Fourier coefficient $C_m$ is calculated according to Equation (8) described below. Equations (7) and (8) also form generation information.

$$C_m = \sum_{y=0}^{H-1} \sum_{x=0}^{W-1} F[x][y] \times \exp(-i(a_m x + b_m y)) \quad (7)$$

$$\theta_m = \arctan(\mathrm{Im}(C_m)/\mathrm{Re}(C_m)) \quad (8)$$

In Equation (8), $\mathrm{Re}(C_m)$ represents a real part of a complex number $C_m$, and $\mathrm{Im}(C_m)$ represents an imaginary part of the complex number $C_m$. As a result, the phase is obtained for each frequency. In the example illustrated in FIG. 8C, phases $\theta_1, \ldots, \theta_6$ are generated at respective frequencies $(a_1, b_1), \ldots, (a_6, b_6)$. The phases and the respective corresponding frequencies are related together to form a video image feature.

The phase registration unit 104 registers the video image feature including the frequencies and the phases in the video image feature storage unit 300 (step S204). In a case where at least two frames are selected from the plurality of frames included in the input video image according to the second embodiment, the phase generation process in step S203 is performed for each frame. As a result, for example, phases including phases $\theta_1[0], \theta_1[1], \ldots, \theta_1[N-T]$ at the frequency $(a_1, b_1)$ to phases $\theta_6[0], \theta_6[1], \ldots, \theta_6[N-T]$ at the frequency $(a_6, b_6)$ are generated. That is, phases are generated in time series for each frequency.

Next, a video image comparison method executed by the video image comparison system 400 is described below with reference to FIGS. 9 and 10.

Figure 9:
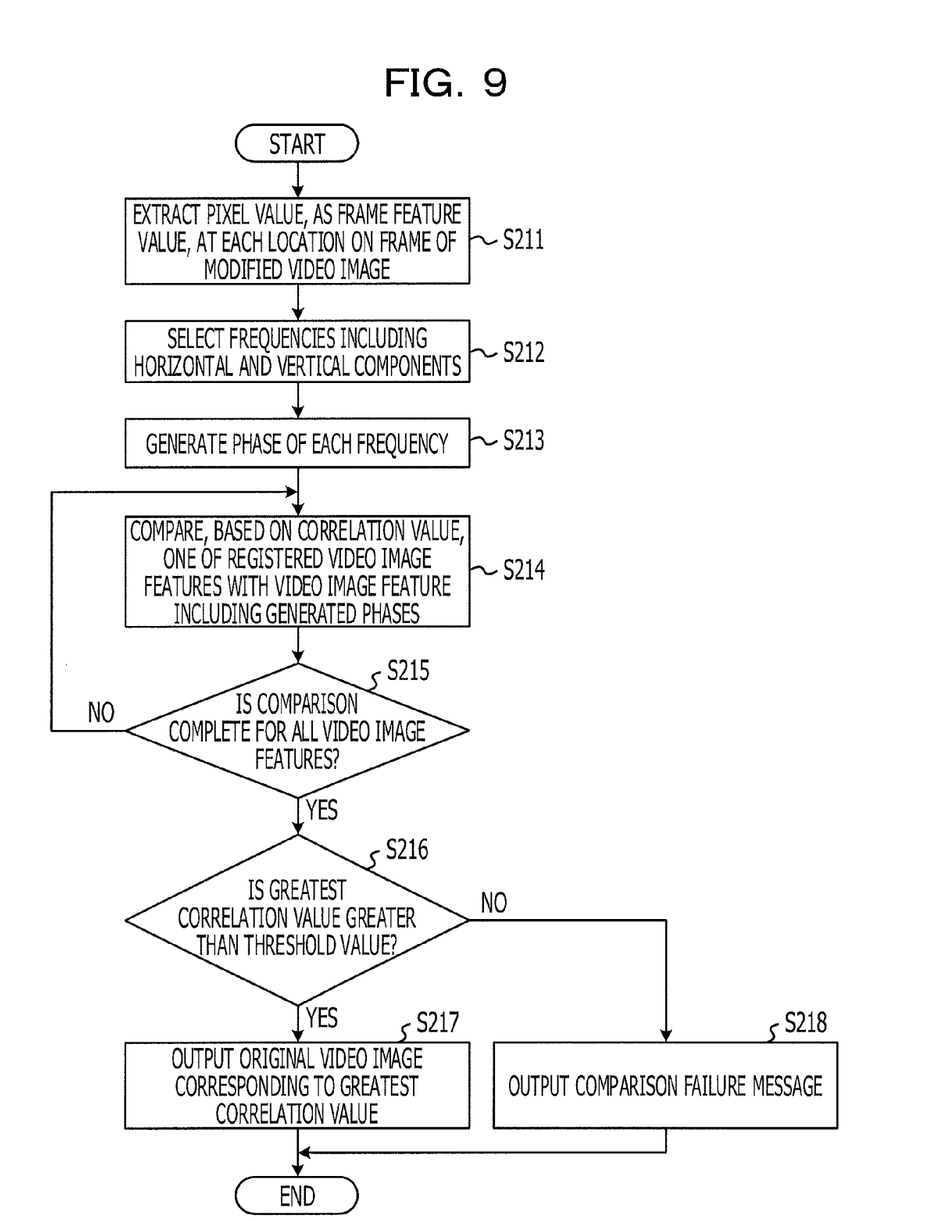
FIG. 9 is a flow chart illustrating an example of a sequence of processing steps performed by a video image comparison system according to a second embodiment.
Figure 10:
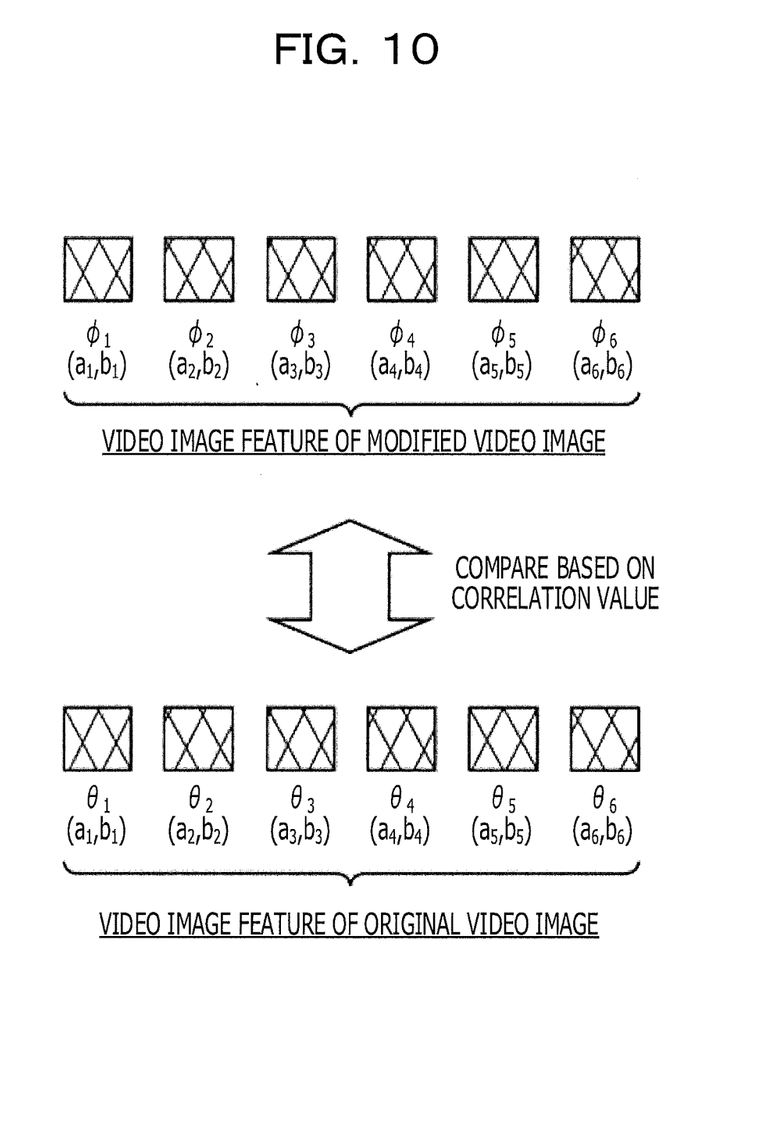
FIG. 10 is a diagram illustrating a manner in which video images are compared according to a second embodiment.

FIG. 9 is a flow chart illustrating an example of a sequence of processing steps performed by the video image comparison system 400 according to the second embodiment. FIG. 10 is a diagram illustrating a manner in which video images are compared according to the second embodiment. Note that steps S211 to S213 described below are basically similar to steps S201 to S203 described above, and steps S214 to S218 described below are basically similar to steps S114 to S118 according to the first embodiment described above.

When a modified video image is input to the frame feature value extraction unit 101, the frame feature value extraction unit 101 extracts a pixel value as a frame feature value at each location on the frame of the modified video image as illustrated in FIG. 9 (step S211). After the frame feature values $F[x_0][y_0], \ldots, F[x_{W-1}][y_{H-1}]$ of the modified video image are extracted by the frame feature value extraction unit 101, the second frequency selection unit 401 selects frequencies including a horizontal component and a vertical component (step S212). In the selecting frequencies, at least two frequencies (for example, L frequencies) are selected. Hereinafter, selected frequencies are denoted as frequencies $(a_0, b_0), (a_1, b_1), \ldots, (a_l, b_l), \ldots, (a_{L-1}, b_{L-1})$. In a case where the second frequency selection unit 401 selects the same frequencies as those selected by the first frequency selection unit 102, the frequencies are given as follows: $(a_l, b_l)=(a_m, b_m), \ldots, (a_{L-1}, b_{L-1})=(a_{M-1}, b_{M-1})$. In a case where frequencies are arranged in order of strength from the highest to the lowest and two frequencies with highest strength are selected by the first frequency selection unit 102, the second frequency selection unit 401 selects all frequencies $(a_0, b_0), (a_1, b_1), \ldots, (a_l, b_l), \ldots, (a_{L-1}, b_{L-1})$.

After the frequencies (for example, frequencies $(a_1, b_1), \ldots, (a_6, b_6)$) are selected by the second frequency selection unit 401, the phase generation unit 103 generates a phase of each frequency (step S213). For example, phases $\phi_1, \ldots, \phi_6$ are generated for the respective frequencies $(a_1, b_1), \ldots, (a_6, b_6)$.

Thereafter, the video image feature comparison unit 402 compares, based on a correlation value, one of video image features registered in the video image feature storage unit 300 with the video image feature including the generated phases (step S214). More specifically, first, the video image feature comparison unit 402 generates the video image feature of the modified video image including the frequencies selected by the second frequency selection unit 401 and the phases of the respective frequencies generated by the phase generation unit 103. Thereafter, the video image feature comparison unit 402 extracts, from the video image feature storage unit 300, a video image feature having the same frequencies as those selected by the second frequency selection unit 401. For example, in a case where the frequencies $(a_1, b_1), \ldots, (a_6, b_6)$ are selected, and the video image feature of the frequencies $(a_1, b_1), \ldots, (a_6, b_6)$ and a video image feature of the frequencies $(a_7, b_7), \ldots, (a_9, b_9)$ are registered in the video image feature storage unit 300, the video image feature of the frequencies $(a_1, b_1), \ldots, (a_6, b_6)$ equal to the frequencies $(a_1, b_1), \ldots, (a_6, b_6)$ is extracted from the video image feature storage unit 300. In a case where there is a plurality of video image features having the same frequencies as those selected by the second frequency selection unit 401, all such video image features are extracted. Hereinafter, for convenience of illustration, frequencies $(a_l, b_l)$ (for example, $(a_1, b_1), \ldots, (a_6, b_6)$) equal to the frequencies $(a_m, b_m)$ (for example, $(a_1, b_1), \ldots, (a_6, b_6)$) are denoted as frequencies $(a'_m, b'_m)$, and corresponding phases are denoted as $\phi'_m$. Thereafter, the video image feature comparison unit 402 acquires one of the plurality of extracted video image features. Subsequently, as illustrated in FIG. 10, the video image feature comparison unit 402 calculates a correlation value $R[k]$ between the acquired video image feature of the original video image and the video image feature of the modified video image thereby evaluates the similarity between them. The correlation value $R[k]$ is temporarily stored.

In the second embodiment, the correlation value $R[k]$ may be calculated according to Equation (9) described below. As may be seen from Equation (9), when phases in time series are projected onto a circle with a radius of 1 in a complex plane (for example, a phase $\theta$ is projected to $\exp(i\theta)$), the correlation value $R[k]$ is given by an inner product of these points. Note that $\exp(i\phi'_m[n])$ with a bar put thereover denotes a complex conjugate number of $\exp(i\phi'_m[n])$.

$$R[k] = \left| \sum_{m=0}^{M-1} \exp(i\theta_m) \times \overline{\exp(i\phi'_m)} \right| \quad (9)$$

In the second embodiment, in the case where at least two frames are selected from a plurality of frames included in the input video image as described above, the correlation value R[k] may be calculated according to Equation (10) described below.

$$R[k] = \sum_{m=0}^{M-1} \left| \sum_{n=0}^{N-1} \exp(i\theta_m[n]) \times \overline{\exp(i\phi'_m[n])} \right| \quad (10)$$

When the comparison process for particular video image features is complete, the video image feature comparison unit 402 then determines whether the comparison is complete for all extracted video image features (step S215). In a case where the determination by the video image feature comparison unit 402 is that the comparison is not complete for all extracted video image features (answer to step S215 is NO), the processing flow returns to step S214. In this case, a next video image feature is acquired from the extracted video image features, the comparison is performed by calculating the correlation value R[k] with respect to the video image feature of the modified video image. When the calculated correlation value R[k] is greater than the temporarily stored immediately previous correlation value R[k], the immediately previous correlation value R[k] is replaced by the calculated new correlation value R[k]. Thus, the correlation value R[k] stored temporarily is highest in value.

In a case where the comparison is complete for all extracted video image feature (answer to step S215 is YES), the video image feature comparison unit 402 determines whether the greatest correlation value R[k] is greater than a threshold value (step S216). In a case where the greatest correlation value R[k] is greater than the threshold value (answer to step S216 is YES), the video image feature comparison unit 402 outputs an original video image corresponding to the greatest correlation value R[k] (step S217). On the other hand, in a case where the greatest correlation value R[k] is not greater than the threshold value (answer to step S216 is NO), the video image feature comparison unit 402 outputs a comparison result indicating that the comparison has failed (step S218).

As described above, the second embodiment may be applied not only to a video image (a motion image) but also to a still image (one frame). When the second embodiment is applied to a still image, a result is not influenced by a change in image size such as an expansion or contraction of an image or a change in aspect ratio because a range of the calculation of each frequency is changed in response to the change in image size, and no change occurs in the strength and the phase of the selected frequencies. In a case where an image has been subjected to a geometric transform such as a spatial position shift, a rotation, cuffing off, or the like, a plurality of correlation values are calculated taking into account shifts caused by possible geometric transforms, and images are compared based on these correlation values. For example, when it is assumed that a modified video image has a rotation of up to ±10 degrees from its original video image, correlation values are calculated taking into account rotations of ±5 degrees and ±10 degrees. Thus, the geometric transform does not have an influence.

In a case where at least two frames are selected from a plurality of frames included in an input video image in the above-described manner according to the second embodiment, that is, when the second embodiment is applied to a motion image, not only a change in image size but also a spatial position shift does not have an influence. For example, in a case where there is a positional shift between an original video image and a modified video image, the phases $\phi'_m[n]$ and $\phi'_{m+1}[n]$ of the respective frequencies $\phi'_m$, $b'_m$) and ($a'_{m+1}$, $b'_{m+1}$) have the same shift. Here, let this shift be denoted by $\delta_m$. When the correlation value obtained for the modified video image with the positional shift $\delta_m$ is R'[k], the right-hand side of correlation value R'[k] is rewritten as Equation (11) described below. Thus, the correlation value R'[k] is equal to the correlation value R[k]. That is, any positional shift of the modified video image from its original video image does not cause a change in correlation value R[k].

$$R'[k] = \sum_{m=0}^{M-1} \left| \sum_{n=0}^{N-1} \exp(i\theta_m[n]) \times \overline{\exp(i\phi'_m[n] + \delta_m)} \right| \quad (11)$$

$$= \sum_{m=0}^{M-1} \left| \exp(-\delta_m) \sum_{n=0}^{N-1} \exp(i\theta_m[n]) \times \overline{\exp(i\phi'_m[n])} \right|$$

$$= \sum_{m=0}^{M-1} \left| \sum_{n=0}^{N-1} \exp(i\theta_m[n]) \times \overline{\exp(i\phi'_m[n])} \right|$$

$$= R[k]$$

The embodiments of the present disclosure have been described in detail above by way of example but not limitation. Note that various changes and modifications are possible without departing from the spirit and scope of the disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A video image feature generation system comprising:
    a processor; and
    a memory which stores a plurality of instructions, which when executed by the processor, cause the processor to execute,
        extracting a frame feature value featuring a frame, which is a unit of an input video image, based on a pixel value of the frame; and
        generating a phase of each frequency as a video image feature based on at least two frequencies, the frame feature value obtained in the extracting, and generation information for generating phases of the frequencies according to the frequencies and the frame feature value.

2. The system according to claim 1, further comprising:
    selecting the at least two frequencies from a result of a Fourier transform performed on the frame feature value obtained in the extracting.

3. The system according to claim 2,
wherein the extracting includes extracting a time series of frame feature values based on pixel values on a plurality of frames included in the video image,
wherein the selecting includes selecting at least two frequencies from a frequency spectrum based on the time series of frame feature values obtained in the extracting,
wherein the generating includes generating a time series of phases of each frequency as a video image feature based on the at least two frequencies obtained in the selecting, the time series of frame feature values obtained in the extracting, and the generation information.

4. The system according to claim 1,
wherein the extracting includes extracting the frame feature value based on all pixel values included in the frame.

5. The system according to claim 4,
wherein the extracting includes extracting the frame feature value based on a mean value of all pixel values included in the frame.

6. The system according to claim 4,
wherein the extracting includes extracting the frame feature value based on a variance of all pixel values included in the frame.

7. The system according to claim 2,
wherein the extracting includes extracting a pixel value as the frame feature value at each location on at least one frame included in the video image,
wherein the selecting includes selecting at least two frequencies including a horizontal component and a vertical component from a frequency domain based on the frame feature value obtained by the extracting,
wherein the generating includes generating a phase of each frequency as a video image feature based on the at least two frequencies obtained by the selecting, the frame feature value obtained by the extracting, and the generation information.

8. A video image feature generation method comprising:
extracting a frame feature value featuring a frame, which is a unit of an input video image, based on a pixel value of the frame; and
generating, by a computer processor, a phase of each frequency as a video image feature based on at least two frequencies, the frame feature value obtained in the extracting, and generation information for generating phases of the frequencies according to the frequencies and the frame feature value.

9. The method according to claim 8, further comprising:
selecting the at least two frequencies from a result of a Fourier transform performed on the frame feature value obtained in the extracting.

10. The method according to claim 9,
wherein the extracting includes extracting a time series of frame feature values based on pixel values on a plurality of frames included in the video image,
wherein the selecting includes selecting at least two frequencies from a frequency spectrum based on the time series of frame feature values obtained in the extracting,
wherein the generating includes generating a time series of phases of each frequency as a video image feature based on the at least two frequencies obtained in the selecting, the time series of frame feature values obtained in the extracting, and the generation information.

11. The method according to claim 8,
wherein the extracting includes extracting the frame feature value based on all pixel values included in the frame.

12. The method according to claim 11,
wherein the extracting includes extracting the frame feature value based on a mean value of all pixel values included in the frame.

13. The method according to claim 11,
wherein the extracting includes extracting the frame feature value based on a variance of all pixel values included in the frame.

14. The method according to claim 9,
wherein the extracting includes extracting a pixel value as the frame feature value at each location on at least one frame included in the video image,
wherein the selecting includes selecting at least two frequencies including a horizontal component and a vertical component from a frequency domain based on the frame feature value obtained by the extracting,
wherein the generating includes generating a phase of each frequency as a video image feature based on the at least two frequencies obtained by the selecting, the frame feature value obtained by the extracting, and the generation information.

15. A non-transitory computer-readable storage medium storing a video image feature generation program that causes a computer to execute a process comprising:
extracting a frame feature value featuring a frame, which is a unit of an input video image, based on a pixel value of the frame; and
generating a phase of each frequency as a video image feature based on at least two frequencies, the frame feature value obtained in the extracting, and generation information for generating phases of the frequencies according to the frequencies and the frame feature value.

16. A video image comparison device comprising:
a processor; and
a memory which stores a plurality of instructions, which when executed by the processor, cause the processor to execute,
extracting a frame feature value featuring a frame for each of first and second video images based on a pixel value of each frame, each video image including frames as units forming the image;
generating a phase of each frequency as a first video image feature for the first video image and a phase of each frequency as a second video image feature for the second video image based on at least two frequencies, the frame feature value extracted by the extraction unit, and generation information for generating phases of the frequencies according to the frequencies and the frame feature value; and
making a comparison between the first and second video image features generated by the generation unit.

* * * * *